Jan. 9, 1945. W. SCHMITZ 2,366,985
WATERTIGHT WATCH-CASE
Filed April 28, 1942 2 Sheets-Sheet 1

Inventor:
Werner Schmitz
By Young, Emery & Thompson
Attorneys

Jan. 9, 1945. W. SCHMITZ 2,366,985
WATERTIGHT WATCH-CASE
Filed April 28, 1942 2 Sheets-Sheet 2
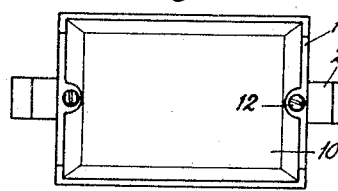
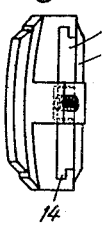
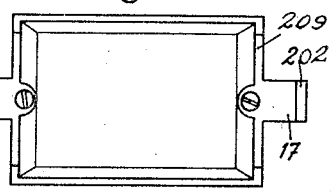
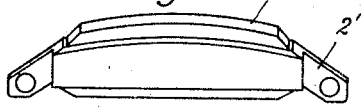
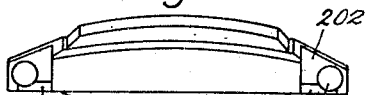
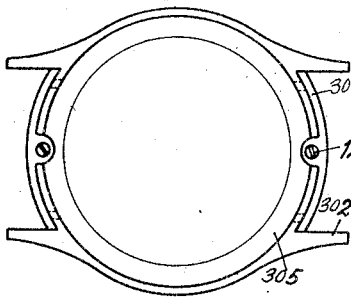
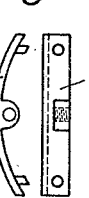
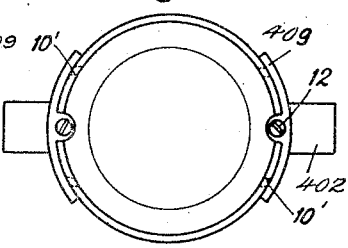
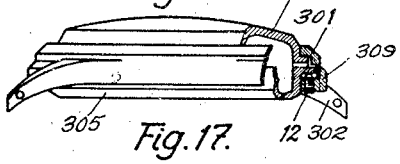
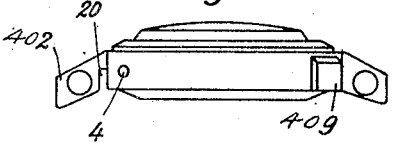
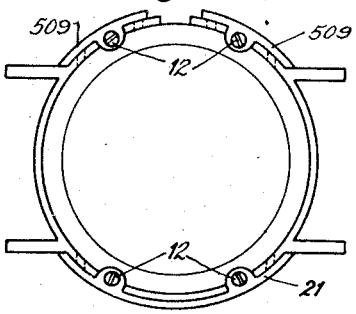
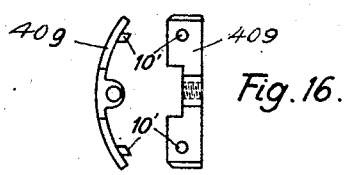
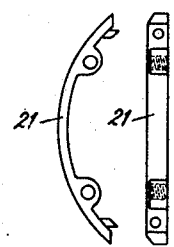
Inventor:
Werner Schmitz
By
Young, Emery, Thompson
Attorneys Patented Jan. 9, 1945

2,366,985

UNITED STATES PATENT OFFICE 2,366,985

WATERTIGHT WATCHCASE

Werner Schmitz, Grenchen, Switzerland

Application April 28, 1942, Serial No. 440,867
In Switzerland September 26, 1941

10 Claims. (Cl. 58—90)

This invention relates to a watertight watch case in which a crystal of synthetic material is clamped between a bezel made in one piece with the bases of the ears and a combined center and bottom.

Watches of this kind are already known having means, particularly screws, exerting pressure between the bezel and the combined center and bottom member in order that the rim of the bezel made of synthetic material between them may be clamped. The prior devices required a special dimensioning of the bases or the ears where the screws were placed, because these latter had to be made large enough to bear the force of compression. The resulting thickness of these parts often formed an obstacle for a pleasing design of the watch case as required by fashion. On the other hand, attempts to conceal these screws in the under part of the case resulted in constructions unsatisfactory with regard to watertightness.

The object of the present invention is to provide a watertight watch case of the above kind and it consists in providing the case with an exterior connecting piece bearing on the base of the ears and carrying at least one pressure screw acting upon the other parts which clamp the crystal. In this way, the connecting piece can be made independent of the case and a dimension and a form can be given to it independent of or corresponding to the contour of the said case. This connecting piece can even be used as an ornament for the case.

The accompanying drawings illustrate, by way of example, a number of watch cases according to the present invention.

Fig. 2 is a side view of the same, partially in section and in

Figure 3:
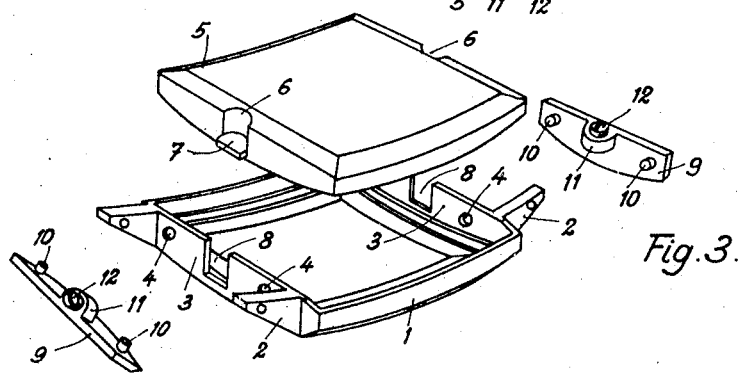
Figure 4:
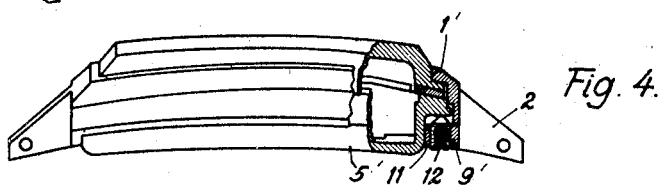

Fig. 3 it is shown in perspective view, the different parts being shown separated;

Fig. 4 is a side view of a second embodiment which is shown in

Figure 5:
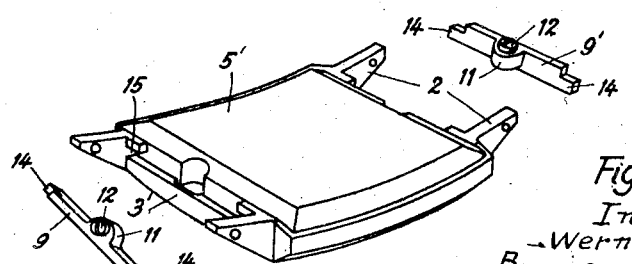

Fig. 5 in perspective, partially taken to pieces,

Fig. 6 is an underside view of a third embodiment of which

Fig. 7 is an end view and

Fig. 8 a side view,

Fig. 9 is an underside view of another embodiment,

Fig. 10 a side view of the same,

Fig. 11 shows, from below, a fifth embodiment, of which

Fig. 12 is a side view, partially in section; and of which

Fig. 13 shows a detail;

Fig. 14 shows, from below, a sixth example of the watch case according to the invention, of which Fig. 15 is a side view.

Fig. 16 shows a connecting piece of the sixth example.

Fig. 17 is an underside view of a seventh embodiment,

Fig. 18 is a side view of the same, partially in section, and

Fig. 19 represents a connecting piece of this example.

Figure 1:
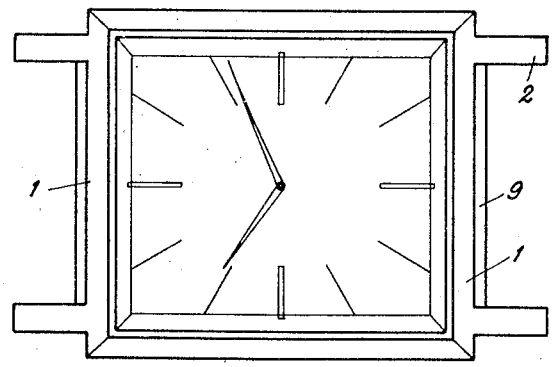
Fig. 1 is a top view of a first embodiment.
Figure 2:
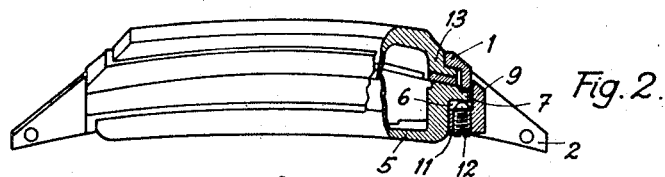

In the watertight watch case shown in Figs. 1, 2 and 3 the bezel 1 is made in one piece with the ears 2 having bases 3 with holes 4.

Into the combined center and bottom 5 of the case, notches 6 are machined, the bottom of these notches being formed by a plate 7 which is either fixed to the case-bottom or formed by upsetting the metal when making the notches 6. This plate 7 is only so large that when the case is assembled, it finds room in an indentation 8 cut in the bases 3 of the ears 2.

On each side of the watch case a connecting piece 9 is provided, having pins 10 of diameter corresponding to the holes 4. This connecting piece has a boss 11 into which a pressure screw 12 is screwed, which, when the case is assembled as shown in Fig. 2, lodges in the notch 6 and which, when tightened, presses against plate 7 and holds the case bottom 5 against the bezel 1. In this way the crystal 13 disposed between bezel 1 and bottom 5 is very effectively tightened. In fact, tightening the screw 12 tends to bend the bezel 1 slightly in order even to apply the delicate parts of the bezel, i. e. the corners, to the combined center and bottom without thereby diminishing the pressure between the latter and the other parts of the bezel.

In the embodiment according to Figs. 4 and 5 the same elements are shown as those constituting the case of Figs. 1, 2 and 3. The connecting pieces 9' carrying the bosses 11 and the screws 12, however, are made thinner at their ends 14 to penetrate into notches 15 cut into the bases 3' of the ears 2. The height of these latter is also diminished in order to prevent the connecting piece 9', once in place as shown in Fig. 4, from projecting beyond the exterior of the watch. The effect of this fastening is the same as described in the first example.

In the embodiment shown in Figs. 6, 7 and 8 the bottom 105 carries but one ear 2' on a side. The connecting piece 109 is likewise held by thin-